United States Patent [19]

Reniers

[11] Patent Number: 5,263,387
[45] Date of Patent: Nov. 23, 1993

[54] METHOD AND DEVICE FOR THE REGULATION OF AN AUTOMATIC TRANSMISSION UNIT IN MOTOR VEHICLES

[75] Inventor: Dirk L. Reniers, Leuven, Belgium

[73] Assignee: Volvo Car Sint-Truiden, naamloze vennootschap, Sint-Truiden, Belgium

[21] Appl. No.: 792,384

[22] Filed: Nov. 15, 1991

[30] Foreign Application Priority Data

Nov. 22, 1990 [BE] Belgium .................... 09001109

[51] Int. Cl.⁵ .................... B60K 41/04; G06F 15/50; F16H 59/00
[52] U.S. Cl. .................... 74/868; 74/866; 74/867; 364/424.1; 474/18; 474/28; 474/70
[58] Field of Search ............ 74/867, 868, 866; 474/18, 28, 69, 70; 364/424.1

[56] References Cited

U.S. PATENT DOCUMENTS

| | | | |
|---|---|---|---|
| 4,152,947 | 5/1979 | van Deursen et al. | 474/28 X |
| 4,296,652 | 10/1981 | Oberpichler et al. | 74/867 X |
| 4,345,489 | 8/1982 | Müller et al. | 74/867 X |
| 4,425,620 | 1/1984 | Bathcheller et al. | 74/866 X |
| 4,494,423 | 1/1985 | McCarthy et al. | 74/867 X |
| 4,522,086 | 6/1985 | Haley | 474/18 X |
| 4,568,317 | 2/1986 | Steuer | 474/28 |
| 4,628,772 | 12/1986 | Nishikawa et al. | 74/868 X |
| 4,628,773 | 12/1986 | Itoh et al. | 74/868 X |
| 4,644,827 | 2/1987 | Takano et al. | 474/28 X |
| 4,663,991 | 5/1987 | Nakamura et al. | 74/868 |
| 4,680,990 | 7/1987 | Ohgami | 74/868 |
| 4,733,582 | 3/1988 | Eggert et al. | 74/867 |
| 4,764,156 | 8/1988 | Ohkumo | 474/28 |
| 4,790,216 | 12/1988 | Eggert et al. | 74/867 X |
| 4,846,765 | 6/1989 | Sakai | 474/28 |
| 4,939,958 | 7/1990 | Hayasaki | 74/868 X |
| 4,995,285 | 2/1991 | Hayakawa et al. | 74/868 X |
| 5,016,174 | 5/1991 | Ito et al. | 74/867 X |
| 5,148,722 | 9/1992 | Mehta | 74/866 |
| 5,183,439 | 2/1993 | Yumoto et al. | 474/28 |

FOREIGN PATENT DOCUMENTS

| | | |
|---|---|---|
| 0229900 | 7/1987 | European Pat. Off. . |
| 0324928 | 7/1989 | European Pat. Off. . |
| 2340486 | 2/1977 | France . |
| 60-249761 | 12/1985 | Japan . |
| 3916177 | 11/1989 | Japan .................... 474/18 |
| 2164397 | 3/1986 | United Kingdom . |

*Primary Examiner*—Leslie A. Braun
*Assistant Examiner*—David E. Henn

[57] ABSTRACT

A method for regulating an automatic transmission unit having a plurality of coupling devices includes supplying a hydraulic medium to a control element; and supplying at least a portion of the hydraulic medium to a hydraulic regulating valve. The control element determines the portion of the hydraulic medium supplied to the hydraulic regulating valve and supplies that portion to the hydraulic regulating valve. The hydraulic regulating valve regulates an operational function of one of the coupling devices. When the central element fails, a safety device regulates the operational function of one of the coupling devices as a function of the revolution speed of a shaft of an engine.

11 Claims, 4 Drawing Sheets

METHOD AND DEVICE FOR THE REGULATION OF AN AUTOMATIC TRANSMISSION UNIT IN MOTOR VEHICLES

BACKGROUND OF THE INVENTION

1. Field of the Invention

The present invention concerns a method and device for the regulation of an automatic transmission unit in motor vehicles.

2. Description of the Related Art

As is known, an automatic transmission unit for motor vehicles usually includes a series of several coupling means such as a torque converter, a coupling unit which can be engaged and disengaged and which has a forward coupling and a reverse coupling, and a continuously variable transmission.

The torque converter is driven by the motor, while the continuously variable transmission drives the wheels via a differential.

Both the torque converter, the couplings, and the continuously variable transmission are controlled by hydraulic control means, which in turn are regulated by electronically driven control valves.

As is known, continuously variable transmissions consist of two V-shaped pulleys in between which a V-belt has been applied. Each pulley is formed of two cone-shaped pulley halves which can move in relation to one another, such that the transmission ratio can be altered by axially shifting the pulley halves of at least one of said pulleys either more or less apart, as a result of which the radius upon which the belt on the pulley is situated is altered. The mutual position of the pulley halves is adjusted as a function of different data by means of the above-mentioned hydraulic regulating means which provide for the moving of one of the pulley halves.

The known embodiments are disadvantageous in that when the electronics fail, the regulation of the above-mentioned coupling means is also interrupted. If the vehicle is not equipped with a torque converter it will be either impossible to drive further with the vehicle, or the transmission will be overloaded and ultimately damaged, as for example, due to the slipping of the belt.

SUMMARY OF THE INVENTION

An object of the present invention is to provide a method and a device offering a solution to the aforementioned disadvantage, such that it is still possible to drive the vehicle when the electronics fail without this having any disastrous effects on the transmission, irrespective of the drive means used in the transmission.

The above object is met by providing a method for the regulation of an automatic transmission unit for motor vehicles, whereby the coupling means of the transmission unit are regulated by at least one hydraulic regulating valve controlled by a control element which is provided with a hydraulic medium by means of a pump, such that when the control element fails, at least a number of the above-mentioned coupling means are controlled by safety means, either directly or indirectly as a function of the amount of revolutions of the motor shaft.

According to a first embodiment, the continuously variable transmission is secured such that beneath a certain amount of revolutions of the motor shaft, the ratio between the radiuses of the driving and driven pulleys is kept to a minimum, whereas at a higher amount of revolutions of the motor shaft the ratio is raised to a maximum.

According to yet another embodiment, the drive-off means are controlled when the control element fails as a function of the amount of revolutions of the motor shaft, such by means of whether or not the same safety means. In a special embodiment, the forward coupling or reverse coupling is controlled such as in this case that the torque which can transmit the coupling rises as the amount of revolutions of the motor shaft rises, so that the coupling may slip at low speeds, but is definitely locked at high speeds.

In the most preferred embodiment, when the control element, which is usually an electronically controlled regulating valve, fails, the hydraulic medium is led through a narrowing area, whereby the pressure in the medium, upstream of the narrowing, is whether or not used to control the above-mentioned hydraulic regulating valve or another regulating valve. This offers the advantage that in case of an emergency, the device can continue to work on an exclusively hydraulic basis.

The recited object is also met by providing a device to carry out the above-mentioned method, in, for example, an automatic transmission unit. The device includes a combination of a hydraulic regulating valve which provides for the supply and the discharge of a hydraulic medium to at least part of the coupling means of the transmission unit; a control element, preferably a servo valve, which controls the regulating valve; a pump which supplies the hydraulic medium; and safety when the above-mentioned control valve fails, controls the regulating valve, directly or indirectly, as a function of the speed of the motor.

According to a first embodiment, the hydraulic regulating valve regulates the supply and discharge of the hydraulic medium at the regulating cylinder of the continuously variable transmission. According to a second embodiment, the regulating valve regulates the excitation of the wet laminated couplings of the automatic transmission. In a preferred embodiment, a combination of both the first and second embodiment is used.

Preferably the safety means consist of a switch valve and a pipe with a narrowing, through which the hydraulic medium is pumped, whereby the switch valve under normal working conditions of the control valve connects the outlet of the control valve with the above-mentioned regulating valve, and when the control valve fails, disconnects the pressure regulating inlet of the regulating valve the outlet of the control valve and connects it to the pipe, upstream of the narrowing.

BRIEF DESCRIPTION OF THE DRAWINGS

In order to better explain the characteristics according to the invention, the following preferred embodiments are described, as an example only and without being limitative in any way, with reference to the accompanying drawings, where.

DETAILED DESCRIPTION OF THE PREFERRED EMBODIMENTS

Figure 1:
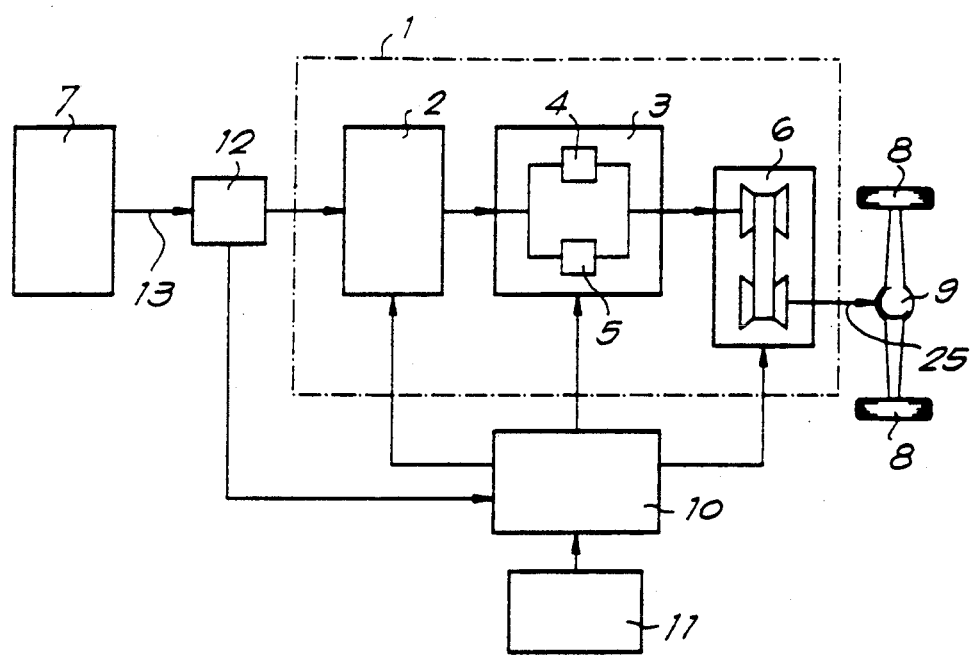
FIG. 1, is a schematic representation of the device according to the invention.

As shown in FIG. 1, an automatic transmission unit 1 may include, as is known, of a series of several coupling devices such as a torque converter 2; a coupling unit 3, which can be engaged and disengaged, formed by a forward coupling 4 and a reverse coupling 5; and a continuously variable transmission 6. In motor vehicles, the torque converter 2 is driven by the engine 7, while the continuously variable transmission 6 drives the wheels 8 via, for example, a differential 9. The whole transmission is controlled by means of a hydraulic regulating unit 10 which is controlled by means of control unit 11. This hydraulic regulating unit 10 is fed with a hydraulic medium, such as oil or another suitable fluid, by means of a pump 12, which is driven by the motor shaft 13.

The hydraulic regulating unit 10 has, as will be further described in detail, one or several control elements, such as servo valves, to control the above-mentioned coupling means of the transmission unit 1. These control units are electronically driven in turn by means of the above-mentioned control unit 11. The present invention is special in that when the electronics fail, one or several of the aforesaid coupling means, either the torque converter 2, the coupling unit 3 which can be engaged and disengaged, or the continuously variable transmission 6, are controlled by means of safety means, either directly or indirectly as a function of the speed of the motor shaft 13.

Figure 2:
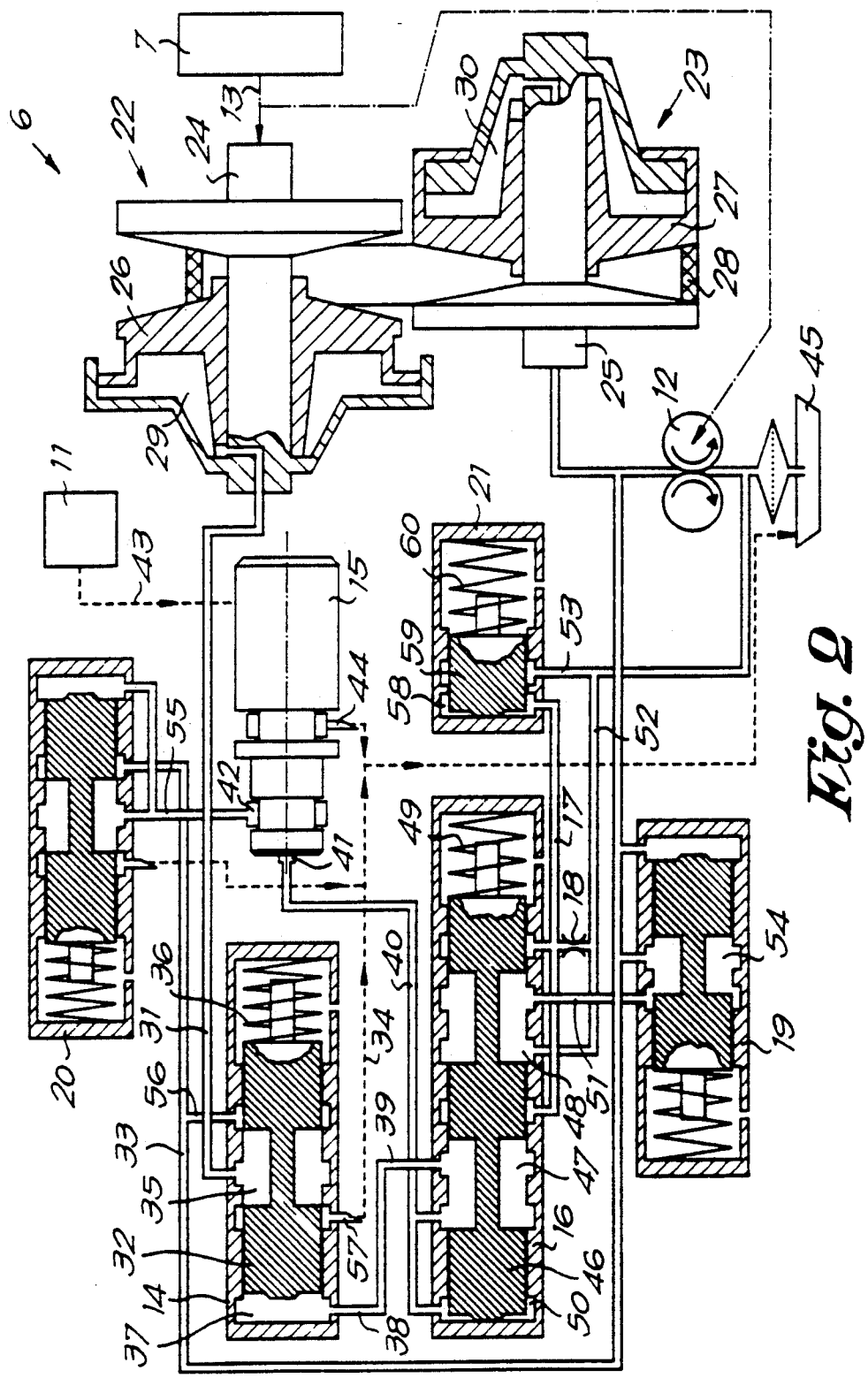
FIG. 2 shows a practical embodiment of part of the device of FIG. 1.
Figure 3:
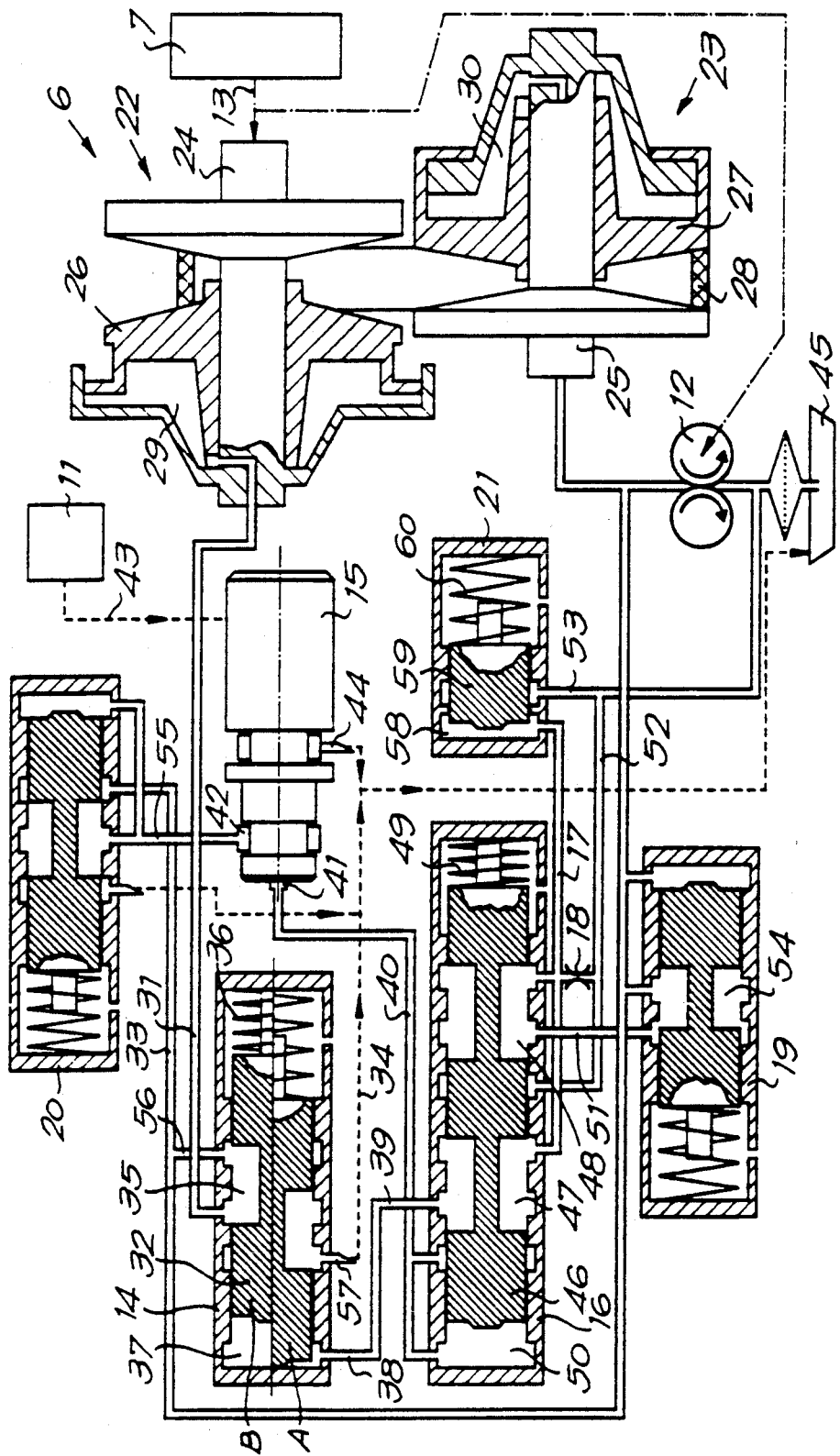
FIG. 3 shows the device from FIG. 2 in another position.

A first example is described hereafter by means of the FIGS. 2 and 3, whereby the above-mentioned method provides for the safety of the continuously variable transmission 6.

The electronic control unit is formed by means of a hydraulic regulating valve 14; a control element such as a control valve 15 which commands the regulating valve 14; safety means which, when the control valve 15 fails, command the regulating valve 14, consisting of a switch element such as a switch valve 16 and a narrowing 18 provided in a pipe 17 through which a fluid can be pumped by means of the pump 12; an overflow valve 19; a pressure regulating valve 20; and an excess pressure valve 21.

The continuously variable transmission 6 consist, as is known, of two V-shaped pulleys 22 and 23, which have been mounted on an ingoing shaft 24 and an outgoing shaft 25, each having an axially moveable pulley half 26 and 27 respectively, which are coupled by means of a transmission belt 28. The pulley halves 26 and 27 can be moved by means of hydraulic cylinders 29 and 30, whereby the effective diameter of the cylinder 29 is bigger than that of the cylinder 30, such that the cylinder 29 functions as a regulating cylinder.

The transmission ratio is regulated by the regulating valve 14 which allows for a fluid to either flow to the cylinder 29 via a pipe 31, or to be discharged from it. To this end, the valve body 32 of the regulating valve 14 is made such that by moving it the pipe 31 is connected to either a supply line 33 on the outlet of the pump 12, or to the discharge pipe 34, via a port 35.

The valve body 32 is loaded on the one hand by a spring 36 and on the other hand by the fluid pressure which acts on the valve body 32 on the opposite side, in particular in the room 37, such that the latter can be moved by altering the pressure.

Under normal working conditions, the pressure in the room 37 is set by the control or servo valve 15. To this end, the pressure regulating inlet 38 of the regulating valve 14 is connected to the outlet 41 of the control valve 15 via pipes 39 and 40, and via the switch valve 16.

The pressure regulating valve 20 is connected to the above-mentioned supply pipe 33 and makes sure there is a constant pressure at the inlet 42 of the control valve 15. The control valve 15 is electronically driven by means of the electronic control unit 11, which as is known emits a signal 43 as a function of various permanently measured parameters.

The excessive fluid delivery at the control valve 15 is pressurelessly discharged via an outlet 44 to a reservoir 45 out of which the hydraulic medium is pumped.

The above-mentioned switch valve 16 has a valve body 46, with two ports 47 and 48, and is loaded on one side by a spring 49 and on the other side by the pressure of the adjacent room 50, which is connected, via the above-mentioned pipe 40, to the outlet 41 of the control valve 15.

The port 47 can, depending on the position of the valve body 46, make a connection between the pipes 39 and 40, or between the pipes 39 and 17. The port 48 connects the discharge pipe 51 of the overflow valve 19 via a pipe 52 to the suction side of the pump 12, or to the pipe 17 upstream of the narrowing 18.

The overflow valve 19 is built in a conventional way and is connected to the supply pipe 33 via its inlet, whereas the outlet is connected to the discharge pipe 51 as mentioned above.

The excess pressure valve 21 prevents too high a pressure from being formed in the pipe 17. The outlet 53 provides for an outlet to the suction side of the pump 12.

The working of the device according to the invention, as well as the accompanying method, are illustrated in FIGS. 2 and 3 by means of two positions, one under normal working conditions and one in situation where the control valve 15 fails, respectively.

Under the normal working conditions, shown in FIG. 2, the fluid is pumped in the pipe 33. The pressure in the pipe 33 and thus also in the cylinder 30 is regulated by the overflow valve 19 and may be adjusted. The excessive fluid is hereby discharged through the port 54 of the overflow valve 19 and led led to the suction side of the pump 12 via pipe 51, port 48 of the switch valve 16 and pipe 52.

The pressure in the room 37 of the regulating valve 14 is regulated by the control valve 15 via pipes 39 and 40 and via the port 47 of the switch valve 16. This pressure valve 15 regulates the pressure in the pipe 40 by either supplying fluid under a constant pressure via the pipe 55 coming from a pressure regulating valve 20, or by carrying off the fluid to the outlet 44.

Under normal working conditions the pressure in the pipe 40 does not exceed a certain value lower than the value of the constant pressure in the pipe 55, such that the valve body 46 of the switch valve 16 is always pressed in the extreme position by the spring 49, as a result of which the pipes 39 and 40 are connected to one another via the port 47 and the pipes 51 and 52 are connected to one another via the port 48. During the normal working condition the control valve 15 is driven by the control unit 11 such that the valve body 32 usually makes small oscillatory motions around the intersection with the connection 56 to the supply pipe 33 and the connection 57 to the discharge pipe 34.

If the electronics driving the control valve 15 fail, the pressure in the pipe 40 becomes equal to the constant pressure in the pipe 55. The spring tension of the spring 49 of the switch valve 16 is selected such that, at the above-mentioned value of the constant pressure coming from the pipe 55, which is also prevalent then in the room 50, the valve body 46 moves against the pressure of the spring 49. As a result, as shown in FIG. 3, the pipes 39 and 51 are connected to the pipe 17, upstream of the narrowing 18, via ports 47 and 48 respectively. The excessive fluid delivery of pipe 51 is then sent through the narrowing 18, as a result of which a pressure is created upstream of this narrowing 18, depending of the discharged delivery. This pressure is almost proportional to the delivery supplied by the pump 12 and thus also with the speed of the engine 7. This pressure is also conducted to the room 37 in the regulating valve 14.

The narrowing 18 is chosen such that when the motorspeed is low, and thus also the delivery in the pipe 17 is low, the pressure upstream of the narrowing 18 is insufficient to move the valve body 32 against the pressure of the spring 36. Thus, the valve body 32 is in the position A as shown in FIG. 3, whereby the pipe 31 is connected to the discharge pipe 34. Thus a small radius of the belt 28 around the pulley 22 is obtained.

As the motorspeed and thus also the delivery in the pipe 17 rise, the pressure upstream of the narrowing 18 increases such that the valve body 32 is moved to the right against the pressure of the spring 36. At a certain delivery in the pipe 17 the valve body 32 is put in an intersectional position, such that the port 35 connects the pipe 31 to the connection 56 on the supply line 33. As a result, the fluid is led to the cylinder 29. As the effective diameter of the cylinder 29 is bigger than that of the cylinder 30, the radius on the primary pulley 22 will increase maximally, while the radius on the secondary pulley 23 will decrease. When the radius around the primary pulley 22 has reached the maximum and the motorspeed further increases, the valve body 32 will move further to the right until it has finally reached the position B.

If the pressure in the pipe 17, upstream of the narrowing 18, is so high that the valve body 32 stands to the right against the stop, a further increase of this pressure resulting from an even higher motorspeed is limited by the overflow valve 21. If the pressure in the room 58 is sufficient, the valve body 59 will move so far against the pressure of the spring 60 that the fluid from the pipe 17 can flow off through the room 58 to the outlet 53, such that the delivery through the narrowing 18 and the pressure in the pipe 17 remain constant at a further increasing motorspeed.

It is clear that, thanks to the invention, it remains possible to drive the vehicle, even when the electronics driving the control valve 15 fail. When driving off, the valve body 32 is in position A of FIG. 3 and the relation of the radius around the secondary pulley 23 to the radius around the primary pulley 22 is maximal. As soon as the engine 7 has reached a certain speed, the valve body 32 of the regulating valve 14 is placed such that delivery is supplied to the primary cylinder 29 as a result of which the above-mentioned ratio drops to its minimum. Therefore, the slipping of belt 28 can be avoided that the belt when taking off, and the engine speed does not become too high when the vehicle is being driven at a high speed.

It is also clear that the above-mentioned method and the above-mentioned safety means cannot be exclusively used for the driving of the regulating cylinder 29 of the continuously variable transmission 6, but can also be used to drive the other coupling means of the transmission unit 1.

The safety function can be combined for two or more of these coupling means. An example is described hereafter by means of FIG. 4 whereby not only the drive of the continuously variable transmission 6 is secured, but also the drive-off means, in particular the wet laminated couplings 4 and 5, such that when the electronic control fails, the torque which can be provided to either of both couplings increases as the speed of the motor shaft increases, such that this coupling may slip at a low speed of the motor shaft and remains locked with certainty at a high speed of the motor shaft.

Figure 4:
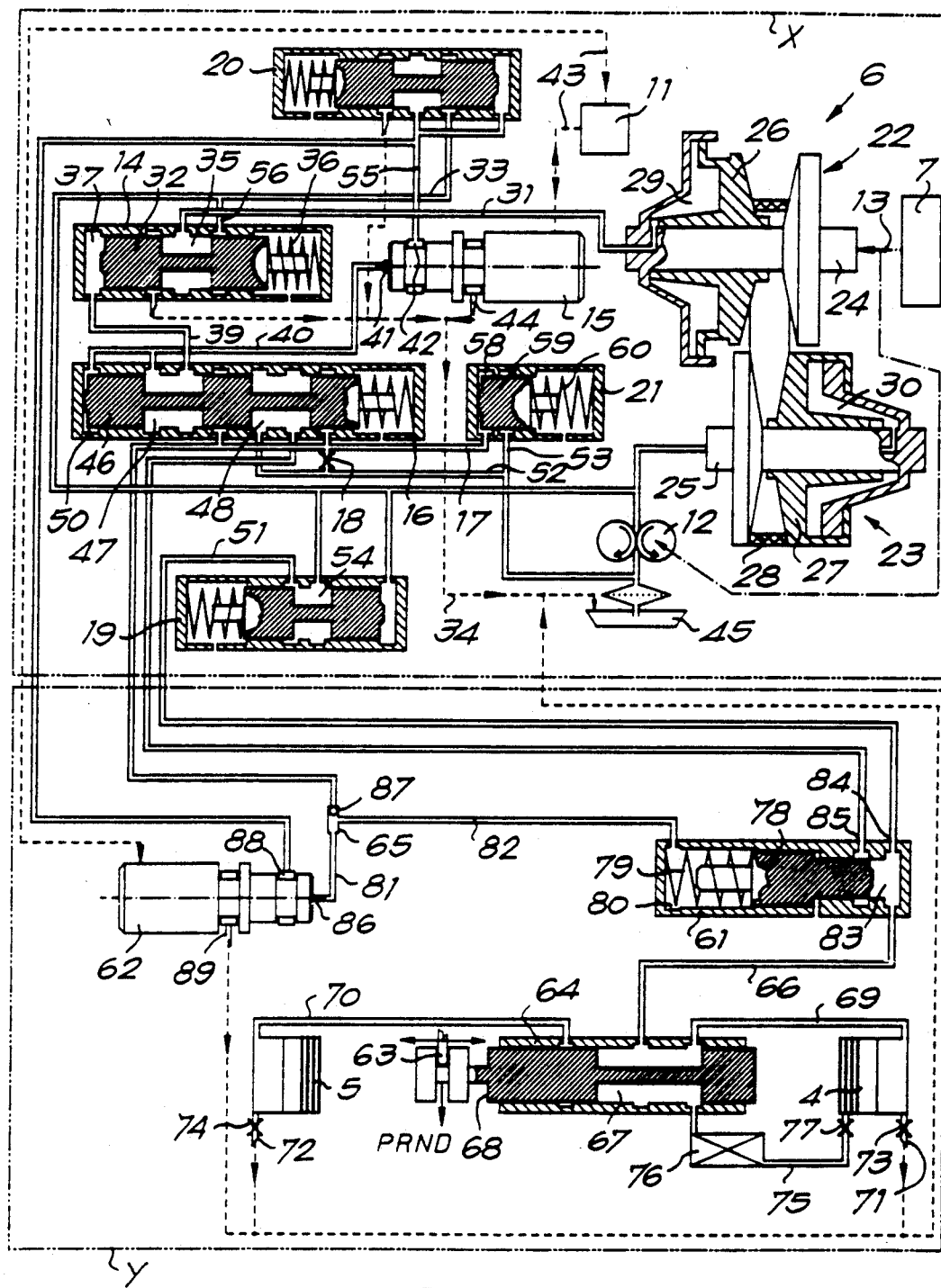
FIG. 4 shows a variant of the device of FIG. 2.

The part X in FIG. 4 largely corresponds to the scheme of the FIGS. 2 and 3. The part Y is related to the control of the couplings 4 and 5.

To this end use is made of a second regulating valve 61, a second control element 62, such as a control valve or servo valve, to drive the second regulating valve 61, a selector switch valve 64 that can be moved by means of the gear lever 63 and a switch element, such as a non-return element 65. The second regulating valve 61 regulates the pressure in the pipe 61 and in the port 67 in the valve body 68 of the selector switch valve 64. This valve body 68 is connected to the gear lever 63. The gear lever 63 has four possible positions: Park, Reverse, Neutral and Drive, indicated by P, R, N and D respectively. In the position D the forward coupling 4 will be engaged, and in the position R the reverse coupling 5.

To this end the selector switch valve 64 is made such that in the position D the fluid is led from the pipe 66 via the port 67 and a pipe 69 to the forward coupling 4, and in the position R via the port 67 and a pipe 70 to the reverse coupling 5. The couplings 4 and 5 consist of wet laminated couplings that are locked when the medium is supplied under sufficient pressure. While the couplings 4 or 5 are excited the fluid is carried off through the discharge pipes 71 and 72 in which narrowings 73 and 74 have been provided.

In the position D a medium to cool off the forward coupling 4 is also supplied via a pipe 75 in which a cooler 76 and a narrowing 77 have been provided.

The second regulating valve 61 regulates the pressure in the above-mentioned pipe 66. This regulating valve 61 is made such that its valve body 78 is loaded on the one hand by a spring 79 and by the pressure in a room 80 that is set by the second control element 62 via pipes 81 and 82 and loaded on the other hand by the pressure in a room 83 which is permanently connected to the above-mentioned pipe 66. The supply of the medium to the room 83 is carried out by means of a connection 84 to the discharge pipe 51 of the overflow valve 19. The excessive medium from the room 83 is carried off via a connection 85 to the port 48 and through the pipe 52.

The above-mentioned non-return element 65 consists of a room which is connected to the above-mentioned pipe 17, to the above-mentioned room 80, as well as to the outlet 86 of the control element 62 via pipe 81, as well as to a ball 87 applied in this room.

The inlet 88 of the second control element 62 is connected to the pressure regulating valve 20, such that a medium is supplied to it under constant pressure.

The control valve 62 regulates the pressure in the pipe 81. The excessive fluid is carried off via an outlet 89 connected to the discharge pipe 34.

When the device operates normally the pipe 17, upstream of the narrowing 18, is pressureless, such that the ball 87, under the influence of the pressure in the pipe 81, is pushed such that pipes 81 and 82 are connected with each other, in particular as shown in FIG. 4. By controlling the regulating valve 62 by means of the control unit 11, the pressure in the room 80 can be regulated. As a result, the second regulating valve 61 in turn regulates the pressure in the supply pipe 66 and in the port 67 and the coupling 4 or 5 connected to the latter. When the pressure is low the coupling will transmit few torques, and many when the pressure is high.

A safety circuit has been integrated in the control unit 11 which makes it possible that when either of the two control valves 15 or 62 fails, the other is also disconnected.

If the electronics driving the second control valve 62 fail, the control valve 15 will thus also be disconnected, as a result of which the valve 16 takes a position as shown in FIG. 3. When the control valve 62 fails, the pipe 81 becomes pressureless and the ball 87 moves such that the pipe 82 is connected to the pipe 17. This has for a result that the pressure in the room 83, in the port 67 and in the engaged coupling 4 or 5 is then regulated as a function of the pressure that is built up upstream of the narrowing 18 and thus also as a function of the amount of revolutions of the pump 12 and of the engine 7. At low speeds the pressure in the pipe 17 and in the engaged coupling will be so low that the latter can slip. As the motorspeed increases however, the pressures in the pipes 17 and 16 rise such that also the pressure in the engaged coupling selected by the selector switch valve 64 rises, as a result of which the slipping of the engine is reduced and the coupling is locked at a certain speed, depending on the torque provided by the engine 7.

It is clear that the above-mentioned safety of the couplings 4 and 5 does not necessarily need to be combined with the safety of the continuously variable transmission 6. Two separate circuits may be used instead, each having a narrowing 18.

The invention can also be applied to other coupling means of the transmission unit, for example the torque converter.

It is clear that the invention does not depend on the type of control valves used. Thus the invention can also be realized when the pressure at the outlet 41 of the control valve 15 becomes nil or when the pressure at the inlet 86 of the control valve 62 becomes maximal when the electronics driving the control valves 15 and 62 fail.

It is clear that the above-mentioned safety means does not necessarily have to be of a hydraulic nature, although this offers the advantage that the device will continue working when all electronics fail. It is not impossible to move the regulating valve 14 in an electric way when the control valve 15 or 62 fails as a function of for example the measured motorspeed, by means of a separate electric circuit. On the other hand, a mechanical transmission between the motor shaft and the regulating valve could also be provided, for example by means of a centrifugal mechanism which is switched on when the control valve 15 or 62 fails.

The present invention is in no way limited to the embodiment described by way of example and shown in the accompanying drawings; on the contrary, such a device and method for the regulation of an automatic transmission unit can be made in all sorts of variants while still remaining within the scope of the invention.

I claim:

1. A device for controlling an automatic transmission, comprising:

at least one hydraulic regulating valve (14, 61) which provides for the supply and discharge respectively, of a hydraulic medium to at least one coupling means of a transmission unit (1); a control element (15, 62) including a control valve which controls the regulating valve (14, 61); a pump (12) which supplies the hydraulic medium; and safety means, including at least one switch element (16, 65) and a pipe (17) with a narrowing (18) through which hydraulic medium can be pumped, which, when said control element (15, 62) fails, controls the regulating valve (14, 61) either directly or indirectly as a function of the speed of an engine (7) of a motor vehicle, wherein when said control valve is operating normally, said switch element connects an outlet of said control valve to a pressure regulating inlet of the regulating valve, and when said control valve fails, said switch element disconnects said pressure regulating inlet from said outlet of said control valve and connects said pressure regulating inlet to said pipe upstream of said narrowing.

2. Device according to claim 1, characterized in that the switch element consists of a switch valve (16) which has a port (48) which, in the position taken by the switch valve (16) when the control valve is operating normally, freely carries off at least part of the hydraulic medium, whereas in the position taken by the switch valve (16) when the control valve (15) fails, it sends the hydraulic medium through the above-mentioned narrowing (18).

3. Device according to claim 2, characterized in that the inlet of the control pressure of the switch valve (16) is connected to the outlet (41) of the corresponding control valve (15); in that the control valve (15) is of the type which automatically makes a connection between its inlet (42) and its outlet (41) when it fails; in that the control valve (15) is driven by means of a control unit (11), such that when the control valve (15) is operating normally the pressure at the outlet (41) retains a value which is lower than the normal feed pressure at the inlet (42); and in that the regulating valve (14) and the switch valve (16) are spring-loaded valves, whose spring tensions have been chosen such that the regulating valve (14) operates at a pressure lower than the above-mentioned value, whereas the switch value (16) only switches at a pressure which is higher than the above-mentioned value and lower than or equal to the feed pressure of the control valve (15).

4. Device according to claim 2, characterized in that the transmission unit has at least two coupling means (3, 6) which are each regulated by means of a hydraulic regulating valve (14, 61). whereby each of both hydraulic regulating valves (14, 61) are driven by means of a control element (15, 62), characterized in that the control valve (62) is of the type which automatically makes a connection between its outlet (86) and its discharge connection (89) when it fails and in that both coupling means are provided with a switch element (16, 65), whereby one of these switch elements is formed of the above-mentioned switch valve (16). whereas the other switch element consists of a non-return element (65) which connects the pressure regulating inlet of the hydraulic regulating valve (61) of the second coupling means either to the outlet (86) of the corresponding control element (62), or to the above-mentioned pipe (17), upstream of the above-mentioned narrowing (18).

5. Device according to claim 4, characterized in that it has a safety circuit which couple e different control elements (15, 62) to one another, and which when one control element fails automatically disconnects the other.

6. Device according to claim 1, characterized in that an overflow valve (19) has been connected to the supply pipe (33) for the hydraulic medium, whose outlet provides for the supply of the hydraulic medium to the pipe (17) with said narrowing (18) via a discharge pipe (51), either directly or indirectly, when the control element (15, 62) fails.

7. Device according to claim 1, characterized in that an excess pressure valve (21) is connected to the above-mentioned pipe (17) with said narrowing (18), upstream of said narrowing (18).

8. A device according to claim 1, further comprising a pressure valve which supplies a constant source of pressure to the control element, and wherein the control element includes a control valve having an inlet, and the inlet receives the constant source of pressure so that a pressure at the inlet is regulated by the pressure valve.

9. A device according to claim 1, wherein the at least one coupling means is a continuously variable transmission having a regulating cylinder, and the hydraulic regulating valve provides for the supply and discharge of the hydraulic medium to the regulating cylinder.

10. A device according to claim 9, wherein the operational function controlled is a transmission ratio.

11. A device according to claim 1, wherein the at least one coupling means is a coupling unit having a forward coupling and a reverse coupling, and the hydraulic medium from the regulating valve is supplied to at least one of the forward and reverse couplings.

* * * * *